(12) United States Patent
Hu et al.

(10) Patent No.: US 12,317,248 B2
(45) Date of Patent: May 27, 2025

(54) METHOD AND APPARATUS FOR RESOURCE ALLOCATION IN V2X

(71) Applicant: LENOVO (BEIJING) LIMITED, Beijing (CN)

(72) Inventors: Jie Hu, Beijing (CN); Jing Han, Beijing (CN); Haiming Wang, Beijing (CN); Lianhai Wu, Beijing (CN); Jie Shi, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 755 days.

(21) Appl. No.: 17/441,605

(22) PCT Filed: Mar. 29, 2019

(86) PCT No.: PCT/CN2019/080562
§ 371 (c)(1),
(2) Date: Sep. 21, 2021

(87) PCT Pub. No.: WO2020/198989
PCT Pub. Date: Oct. 8, 2020

(65) Prior Publication Data
US 2022/0167365 A1 May 26, 2022

(51) Int. Cl.
*H04W 72/121* (2023.01)
*H04W 4/40* (2018.01)

(52) U.S. Cl.
CPC .......... *H04W 72/121* (2013.01); *H04W 4/40* (2018.02)

(58) Field of Classification Search
CPC . H04W 76/23; H04W 76/28; H04W 52/0235; H04W 72/25; H04W 72/04;
(Continued)

(56) References Cited

U.S. PATENT DOCUMENTS

| 10,123,338 B2 | 11/2018 | Noh et al. |
| 2015/0351143 A1 | 12/2015 | Seymour et al. |

(Continued)

FOREIGN PATENT DOCUMENTS

| CN | 103947135 A | 7/2014 |
| CN | 104469960 A | 3/2015 |

(Continued)

OTHER PUBLICATIONS

International Searching Authority, "Written Opinion of the International Searching Authority," PCT/CN2019/080562, Dec. 26, 2019, pp. 1-4.

(Continued)

*Primary Examiner* — Iqbal Zaidi
(74) *Attorney, Agent, or Firm* — Kunzler Bean & Adamson

(57) ABSTRACT

Method and apparatus for resource allocation in V2X are disclosed. One method of a network equipment includes receiving a configuration request from a first UE, which is used to indicate that the first UE intends to assist in resource allocation for a group of UEs, wherein, the configuration request includes one or more of a group ID, group member information, the first UE ID and the first UE capability; determining one or more of the first UE are schedulers assisting in resource allocation for the group of UEs; transmitting a configuration response to the determined one or more of the first UE, which is used to indicate that the determined one or more of the first UE are the schedulers assisting in resource allocation for the group of UEs.

19 Claims, 6 Drawing Sheets

(58) Field of Classification Search
CPC ............ H04W 72/121; H04W 72/1278; H04B 7/06952
See application file for complete search history.

(56) References Cited

U.S. PATENT DOCUMENTS

| | | | |
|---|---|---|---|
| 2020/0229192 A1* | 7/2020 | Novlan | H04W 72/23 |
| 2022/0022199 A1* | 1/2022 | Zhao | H04L 5/0094 |
| 2023/0050943 A1* | 2/2023 | Luo | H04W 72/542 |
| 2023/0069615 A1* | 3/2023 | Hu | H04W 72/121 |

FOREIGN PATENT DOCUMENTS

| | | |
|---|---|---|
| CN | 106576079 A | 4/2017 |
| EP | 2768269 A1 | 8/2014 |
| WO | 2015122078 A1 | 8/2015 |

OTHER PUBLICATIONS

Fraunhofer HHI, Fruanhofer IIS, Designs for Nr V2X Mode 2 Resource Allocation, 3GPP TSG RAN WG1 Meeting #95, R1-1812399, Nov. 12-16, 2018, pp. 1-10, Spokane, USA.
Mediatek Inc., UE-assisted resource allocation for NR V2X, 3GPP TSG-RAN WG2 Meeting #105, R2-1900815, Feb. 25,-Mar. 1, 2019, pp. 1-5, Athens, Greece.
Nokia, Nokia Shanghai Bell, On Sidelink Resource Allocation, 3GPP TSG RAN WG1 Meeting #85, R1-1813522, Nov. 12-16, 2018, pp. 1-6, Spokane, USA.

* cited by examiner

METHOD AND APPARATUS FOR RESOURCE ALLOCATION IN V2X

FIELD

The subject matter disclosed herein relates generally to wireless communication and more particularly relates to resource allocation in V2X scenario.

BACKGROUND

The following abbreviations and acronyms are herewith defined, at least some of which are referred to within the following description.

Third Generation Partnership Project ("3GPP"), Downlink ("DL"), Evolved Node B ("eNB"), European Telecommunications Standards Institute ("ETSI"), Frequency Division Duplex ("FDD"), Frequency-Division Multiplexing ("FDM"), Frequency Division Multiple Access ("FDMA"), Information Element ("IE"), Long Term Evolution ("LTE"), LTE Advanced ("LTE-A"), Network Equipment (NE), Master Information Block ("MIB"), Machine Type Communication ("MTC"), Radio Resource Control ("RRC"), Resource Reservation Field ("RRF"), Reference Signal Receiving Power ("RSRP"), Reference Signal Receiving Quality ("RSRQ"), Reference Signal Strength Indicator ("RSSI"), Receive ("RX"), System Information Block ("SIB"), Time Division Duplex ("TDD"), Time-Division Multiplexing ("TDM"), Transmit ("TX"), User Entity/Equipment (Mobile Terminal) ("UE"), Uplink ("UL"), Universal Mobile Telecommunications System ("UMTS"), Vehicle-to-Vehicle ("V2V") and Vehicle-to-Everything ("V2X").

There have been an increased interests in enhancement of the Cellular-based V2X services (V2V, V2I/N, and V2P) in a holistic and complementary manner as respect to V2X in 3GPP Rel-14, which will involve enhancements for both Uu interface and PC5 interface.

One of the objectives for this study is to design a comprehensive mode for resource allocation so that UEs, especially the UEs out of the coverage of gNB, can obtain resource scheduled by gNB in an effective manner. Particularly, as described in 3GPP specifications related to V2X, mode 1 for resource allocation usually refers to that a UE using the sidelink resource(s) scheduled by base station for sidelink transmission(s), while mode 2 for resource allocation refers to that a UE taking its own determination of its sidelink transmission resource(s) form a sidelink resource pool indicated by gNB or a pre-configured sidelink resource pool. That is, the base station does not schedule resource for the UE in mode 2. Further, the definition of mode 2 for resource allocation indicates potential sidelink radio-layer functionalities or includes several sub-modes for resource allocations. However, the details of mode 2, including sub-modes of mode 2, has not been resolved, therefore, it's necessary to study the resource allocation in mode 2.

BRIEF SUMMARY

In V2X scenario, it will be a common situation that most of UEs in a group of UEs are out of the coverage of a NE such as gNB, while limited UEs in the group of UEs can maintain a communication with the NE, i.e. they are in the coverage of the NE. Therefore it's necessary to design a mechanism of resource allocation for the UEs which cannot communicate with the NE directly. In another aspect, even the UEs are able to set up communication links with the NE, it would cost notable processing power of the NE. Therefore enhancements on resource allocations for the group of UEs not only contribute to scheduling resources for a UE which has transmitted a schedule request in a timely and effective way, but also improve the usage of processing power of the NE.

Method and apparatus for resource allocation in V2X are disclosed. One method proposed for a network equipment includes receiving a configuration request from a first UE, which is used to indicate that the first UE intends to assist in resource allocation for a group of UEs, wherein, the configuration request includes one or more of a group ID, group member information, the first UE ID and the first UE capability; determining one or more of the first UE are schedulers assisting in resource allocation for the group of UEs; transmitting a configuration response to the determined one or more of the first UE, which is used to indicate that the determined one or more of the first UE are the schedulers assisting in resource allocation for the group of UEs.

In another aspect, One method proposed for a first UE which is able to be a scheduler includes transmitting a configuration request to a network equipment, which is used to indicate an intention of assisting in resource allocation for a group of UEs, wherein, the configuration request includes one or more of a group ID, group member information, the first UE ID and the first UE capability; receiving a configuration response from the network equipment, in the case that the first UE is selected as the scheduler by the network equipment. Further, the first UE will broadcast an indication at least including the group ID to the group of UEs, which indicates it is the scheduler assisting in resource allocation.

In another aspect, One method proposed for a second UE which is a member UE includes receiving an indication including a group ID from a first UE, which is used to indicate that the first UE intends to be a scheduler assisting in resource allocation for the group of UEs including the apparatus; determining that the first UE is the scheduler assisting in resource allocation. Further, the second UE will transmit a scheduling request to the selected scheduler, which indicates the resource allocation is required.

The method and apparatus herein do not only provide a mechanism of resource allocation for the UEs in V2X, in which the UEs can acquire resource in the assistance of another UE as a scheduler so that the processing power of the NE is saved, but also consider reliability of resource allocation especially in the case that the scheduler is unavailable. Thus, the method and apparatus herein contribute to enhancements on resource allocation as well as improvements on usage of processing power of the NE.

BRIEF DESCRIPTION OF THE DRAWINGS

A more particular description of the embodiments briefly described above will be rendered by reference to specific embodiments that are illustrated in the appended drawings. Given that these drawings depict only some embodiments and are not therefore to be considered to be limiting in scope, the embodiments will be described and explained with additional specificity and detail through the use of the accompanying drawings, in which.

DETAILED DESCRIPTION

Figure 1A:
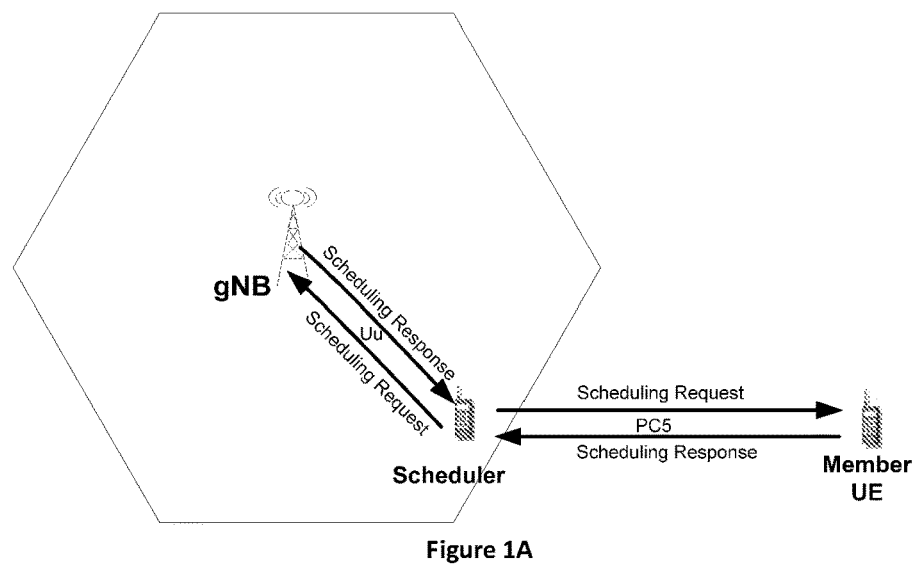
FIGS. 1A, 1B and 1C are a schematic diagrams illustrating signaling transmission in V2X.

As will be appreciated by one skilled in the art, aspects of the embodiments may be embodied as a system, apparatus, method, or a program product. Accordingly, embodiments may take the form of an all-hardware embodiment, an all-software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, one or more embodiments may take the form of a program product embodied in one or more computer readable storage devices storing machine readable code, computer readable code, and/or program code, referred to hereafter as "code". The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but is not limited to being, an electronic, magnetic, optical, electromagnetic, infrared, holographic, micromechanical, or semiconductor system, apparatus, or device, or any suitable combination of the foregoing.

A non-exhaustive list of more specific examples of the storage device may include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Reference throughout this specification to "one embodiment", "an embodiment", or similar language means that a particular feature, structure, or characteristic described in connection with the embodiment is included in at least one embodiment. Thus, appearances of the phrases "in one embodiment", "in an embodiment", and similar language throughout this specification may, but do not necessarily, all refer to the same embodiment, but mean "one or more but not all embodiments" unless expressly specified otherwise. The terms "including", "comprising", "having", and variations thereof mean "including but not limited to", unless expressly specified otherwise. An enumerated listing of items does not imply that any or all of the items are mutually exclusive, unless expressly specified otherwise. The terms "a", "an", and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of various embodiments are described below with reference to schematic flowchart diagrams and/or schematic block diagrams of methods, apparatuses, systems, and program products. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions—executed via the processor of the computer or other programmable data processing apparatus—create a means for implementing the functions/acts specified in the schematic flowchart diagrams and/or schematic block diagrams.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams.

The code may also be loaded onto a computer, other programmable data processing apparatus, or other devices to cause a series of operational steps to be performed on the computer, other programmable apparatus, or other devices to produce a computer implemented process such that the code executed on the computer or other programmable apparatus provides processes for implementing the functions/acts specified in the schematic flowchart diagrams and/or schematic block diagram.

The schematic flowchart diagrams and/or schematic block diagrams in the Figures illustrate the architecture, functionality, and operation of possible implementations of different apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s). One skilled in the relevant art will recognize, however, that the flowchart diagrams need not necessarily be practiced in the sequence shown in the Figures, and are able to be practiced without one or more of the specific steps, or with other steps not shown in the Figures.

It should also be noted that, in some alternative implementations, the functions noted in the identified blocks may occur out of the order noted in the Figures. For example, two blocks shown in succession may, in fact, be substantially executed in concurrence, or the blocks may sometimes be executed in reverse order, depending upon the functionality involved. Other steps and methods may be conceived that are equivalent in function, logic, or effect to one or more blocks, or portions thereof, to the illustrated Figures.

The description of elements in each figure may refer to elements of proceeding figures. Like numbers refer to like elements in all figures, including alternate embodiments of like elements.

Enhancement of resource allocation for UEs in a group of UEs should be studied to enable the UEs, especially the UEs out of the coverage of a NE, to learn available resource for sidelink transmission in a timely and effective manner. Therefore, a scheduler, which is also a UE in the group, should be determined in the first place to assist in resource allocation for other members. It could be understood that the scheduler is required to maintain a communication link with the NE in order to forward requests and responses between the member UEs and the NE. In another aspect, in the case that a member UE cannot obtain the required resource through a scheduler, it is allowed for the member UE to seek another way to apply for the resource. In one embodiment, the member UE can select a new scheduler according to a predefined rule. In another embodiment, the member UE can switch to another mode of resource allocation, such as mode 1 in which the member UE communicates with the NE directly to apply for the resource, mode 2 in which the member UE determines its sidelink transmission resource on its own.

It should be noted that the scheduler, which is also a UE in the group and intends to assist in resource allocation for the group of UEs, is named as a first UE herein, while the member UE, which usually does not set up a communication link with the NE and acquire resource e.g. for sidelink transmission through the scheduler, is named as a second UE herein. In addition, the term network equipment includes but is not limited to the base station such as gNB.

Figure 1B:
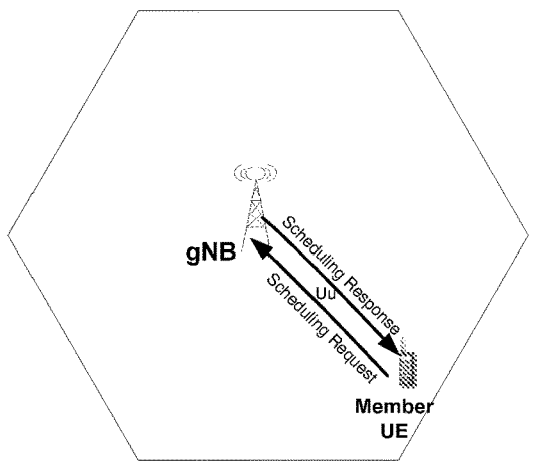
Figure 1C:
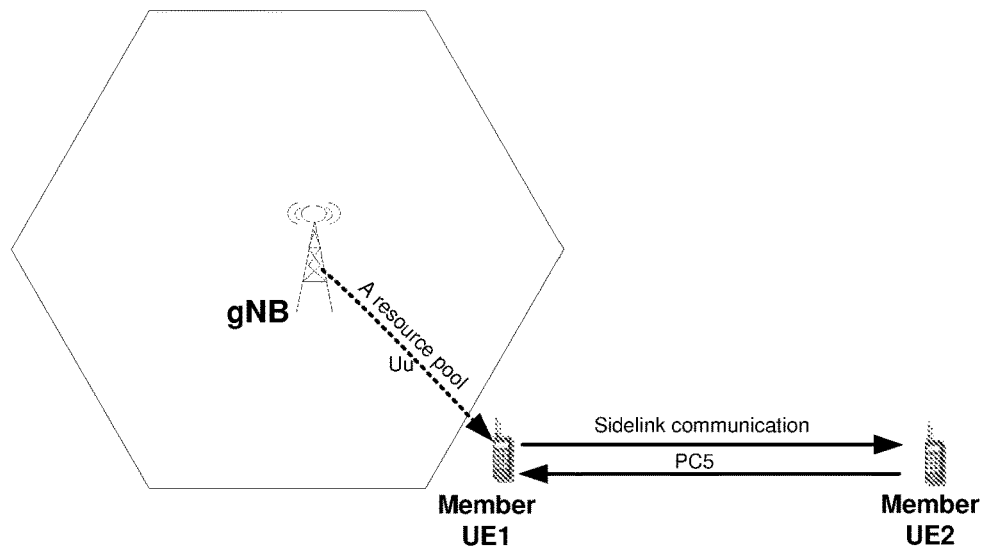

FIGS. 1A, 1B and 1C are a schematic diagrams illustrating signaling transmission in V2X.

As shown in FIG. 1A, the scheduler is in the coverage of the gNB, and communicates with gNB through Uu interface. The member UE, which is shown to be out of the coverage of the gNB—but it's not a limitation, communicates with the scheduler through sidelink interface, i.e. PC5 interface. Examples of signaling are also shown in FIG. 1A. Particularly, the member UE transmits a RRC signaling of scheduling request to apply for resource over PC5 interface, and then the scheduler forward the signaling of scheduling request to the gNB over Uu interface. In response to receiving the signaling of scheduling request, the gNB transmits a schedule response, which may indicate a resource pool or dedicated resource available for the member UE, to the scheduler over Uu interface, correspondingly, the scheduler forward the signaling of scheduling response to the member UE.

In another aspect, in the case that the scheduler is not available for the member UE, as shown in FIG. 1B which illustrates mode 1 for resource allocation in V2X, the member UE needs to communicate with the gNB directly over Uu interface. For example, the scheduling request for applying for resource is transmitted from the member UE to the gNB, correspondingly, the scheduling response for indicating available resources is transmitted from gNB to the member UE.

Alternatively, in the case that the scheduler is not available for the member UE, as shown in FIG. 1C which illustrates mode 2 for resource allocation in V2X, the member UE1 needs to determine its sidelink resource on its own, for example, from a resource pool pre-indicated by the gNB over Uu interface. The dash line between the gNB and member UE1 indicates that the resource pool was configured or indicated by the gNB when the member UE1 was in the coverage of the gNB. Although it is shown that the member UE1 is out of the coverage of the gNB, but it's not a limitation. And then, the member UE1 performs a sidelink communication with the member UE2 using the determined resource over PC5 interface.

It could be understood that the member UE attempts to obtain the resource in the assistance of the scheduler firstly, as shown in FIG. 1A. In the case that the first attempt of acquiring resource is failed, the member UE can attempt to obtain the resource by direct communication with the gNB if it's in the coverage of the gNB (i.e. mode 1 for resource allocation), or determine the resource from a pre-indicated resource pool by the gNB or a pre-configured resource pool if it's out of the coverage of the gNB (i.e. mode 2 for resource allocation). Alternatively, the gNB may configure in advance that the member UE should attempt to obtain the resource for sidelink transmission using mode 2 no matter if it is in the coverage or not. In this way, the load of the gNB can be relieved, and further the processing power thereof can be saved.

Figure 2:
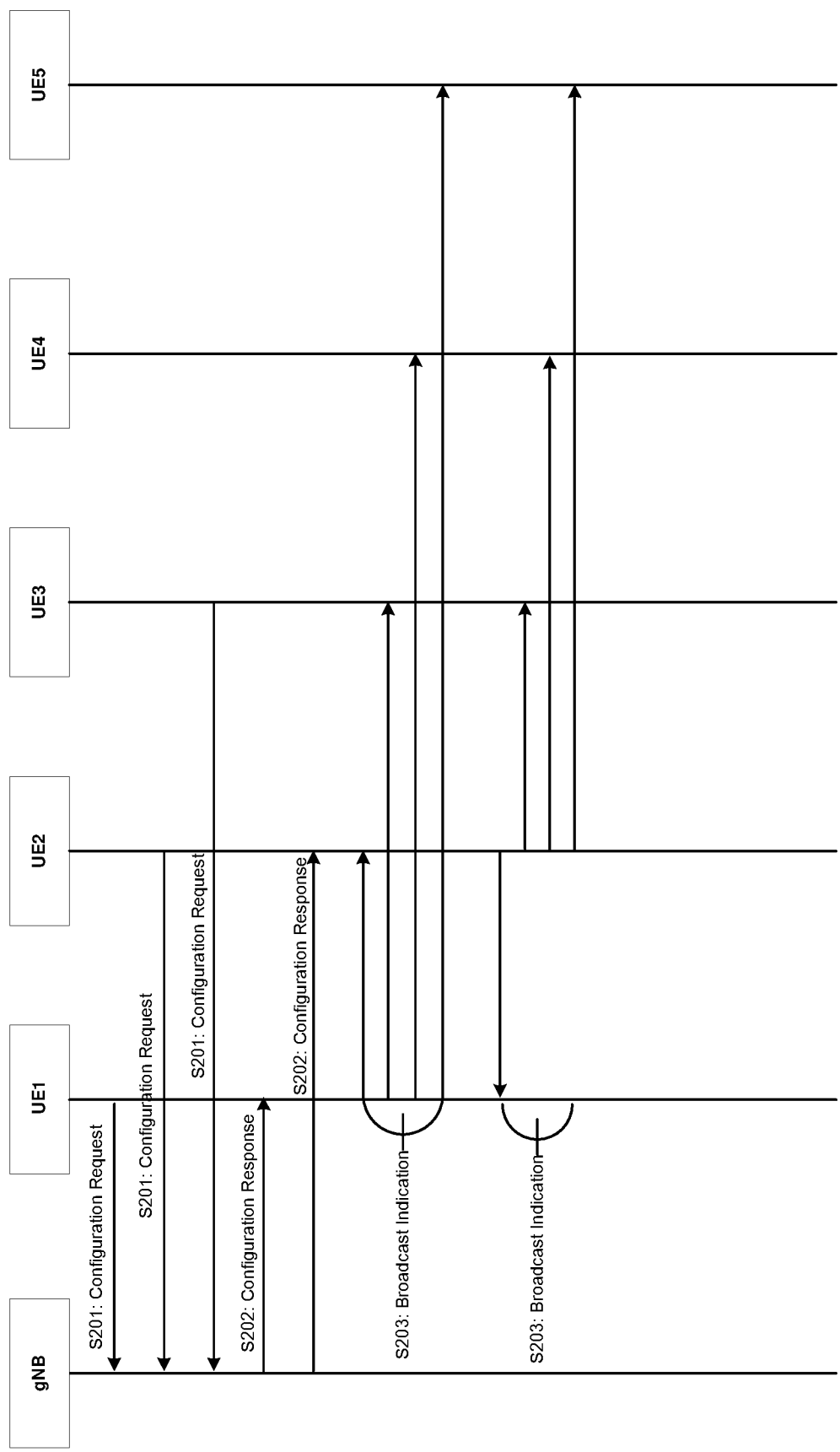
FIG. 2 is a call flow illustrating a determination of schedulers assisting in resource allocation for a group of UE by a gNB according to a first embodiment.

FIG. 2 is a call flow illustrating a determination of schedulers assisting in resource allocation for a group of UE by a gNB according to a first embodiment.

As shown in FIG. 2, in step S201, UE1, UE2 and UE3 in a group of UEs which includes UE1, UE2, UE3, UE4, UE4 and other UEs (not shown) transmits a RRC signaling of configuration request, which is used to indicate that these three UEs intend to assist in resource allocation for the group of UEs. Particularly, the configuration request from UE1 includes one or more of the group identification (ID), the group member information, UE1 ID and UE1 capability. Similar, the configuration request from UE2 includes similar elements with UE2 ID and UE2 capability instead of UE1 ID and UE1 capability respectively, and the configuration request from UE3 also includes similar elements with UE3 ID and UE3 capability instead of UE1 ID and UE1 capability respectively. Wherein, the group member information refers to a member list that the first UE (i.e. UE1, UE2 or UE3) can assist in a respect of resource allocation. For example, the group member information from UE1 may include UE4, the group member information from UE2 may include UE5, and the group member information from UE3 may include both UE4 and UE5. The first UE (UE1, UE2, and UE3) capability indicates whether the first UE is able to assist in resource allocation besides the legacy capability defined in 3GPP specification.

In step S202, the gNB determines one or more of the first UE are schedulers assisting in resource allocation for the group of UEs. In one embodiment, the gNB determines the scheduler from UE1, UE2 and UE3 based on the group member information reported in the corresponding configuration requests. In the above example in which UE1 can assist UE4, UE2 can assist UE5 and UE3 can assist both UE4 and UE5 in the aspect of resource allocation, the gNB may select a combination of UE1 and UE2 as the scheduler, or select UE3 as the scheduler, in order to cover as many member UEs as possible. In another embodiment, the gNB determines the scheduler from UE1, UE2 and UE3 based on the UE capability reported in the corresponding configuration requests. For example, in the case that UE3 capability indicates that UE3 cannot assist in the resource allocation, the gNB eliminates UE3 from being a scheduler. In yet another embodiment, the gNB determines the scheduler from UE1, UE2 and UE3 based on the signal strength such as RSRP value, RSRQ values, or RSSI values reported by the corresponding UE, for example in measurement reports from the corresponding UE. For example, the gNB may select the UE signal strength of which is higher than that of other UEs as the scheduler. Thus, it could be understood that the gNB determines one or more of the first UE are schedulers assisting in resource allocation for the group of UEs, according to one or more of the group member information, the first UE capability, signal strength from the first UE. Once the schedulers are resolved, the gNB transmits a configuration response to the determined schedulers, which is used to indicate that these UE are the schedulers assisting in resource allocation for the group of UEs. As shown in step s202, the gNB transmits the configuration response to both UE1 and UE2 in order to indicate that these UE are the schedulers assisting in resource allocation for the group of UEs In step S203, the scheduler (i.e. UE1 or UE2 as shown in FIG. 2) broadcasts an indication to the group of UEs, which is used to indicate that this UE is the scheduler assisting in resource allocation for the group of UEs. In one embodiment, the indication includes the group ID thereby the member UE (i.e. UE4 or UE5 as shown in FIG. 2) regards the UE, from which the indication is received, as the scheduler. In another embodiment, besides the group ID, the indication further includes both a second threshold and a second time duration used by the member UE to determine its scheduler assist in the resource allocation, which will be described with FIG. 3.

Since the indication is broadcasted to the group of UEs, it is possible that the UE, which does not need assistance for the resource allocation (for example, UE1), also receives the indication. In that case, the UE can ignore the indication and keep the original mode of resource allocation. Alternatively, the UE can accept the assistance of the scheduler thereby it will apply for resource through the scheduler later.

In one embodiment, the scheduler (i.e. UE1 and UE2) broadcasts the indication to its member list according to the group member information reported in the configuration request. In that case, UE1 transmits the indication to UE4, while UE2 transmits the indication to UE5. In this way, the sidelink transmission resource are saved.

Figure 3:
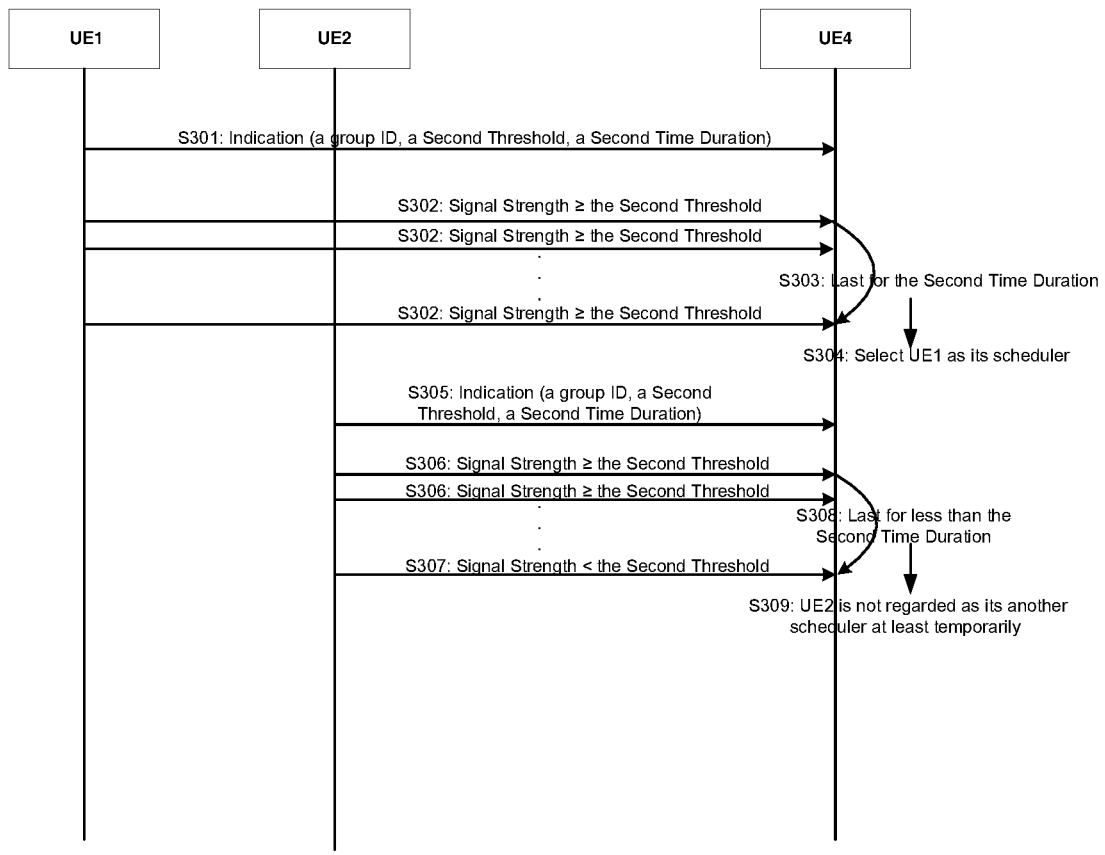
FIG. 3 is a call flow illustrating a determination of schedulers assisting in resource allocation by a member UE according to a second embodiment.

FIG. 3 is a call flow illustrating a determination of schedulers assisting resource allocation by a member UE according to a second embodiment.

As mentioned above, in the case that the indication further includes both a second threshold and a second time duration, the member UE will determine its scheduler assist in the resource allocation considering these two values.

In step S301, once UE1 is determined as a scheduler assist in the resource allocation for the group of UEs by the gNB, UE1 broadcasts or transmits an indication including the group ID, the second threshold, and the second time duration to the member UE (i.e. UE4 as shown in FIG. 3).

In step S302, UE4 learns the signal strength from UE1 continually (for example, periodically). For example, the signal strength may be included in the measurement report from UE1 to UE4. Further, the signal strength from UE1 is higher than the second threshold consistently.

In step S303, UE4 determines that the signal strength from UE1 is higher than the second threshold for the second time duration, which results in that UE4 determining UE1 as its scheduler assisting in the resource allocation in step S304.

Taking another scheduler of UE2 as a counter-example, similarly, once UE2 is determined as a scheduler assist in the resource allocation for the group of UEs by the gNB, UE2 broadcasts or transmits an indication including the group ID, the second threshold, and the second time duration to UE4, as shown in step S305.

In step S306, UE4 learns the signal strength from UE2 continually (for example, periodically).

However, in step S307, the signal strength from UE2 is lower than the second threshold before the second time duration expires, which results in that the signal strength from UE2 being higher than the second threshold for less than the second time duration in step S308. Thus, in step S308, UE4 does not regard UE2 as its scheduler at least temporarily.

In another aspect, in the case that the first UE (i.e. UE1 and UE2 as shown in FIG. 2) is not qualified as the scheduler for the second (member) UE (i.e. UE4 as shown in FIG. 2), for example, the signal strength from neither UE1 nor UE2 is larger than the second threshold for a second time duration, the member UE will switch to another mode of resource allocation in which the resource allocation for itself is not assisted by the scheduler.

It could be understood that the scheduler determined by the gNB may not be suitable to assist in the resource allocation for the group members. Thus, it's necessary to define conditions used to deprive the scheduler.

Figure 4:
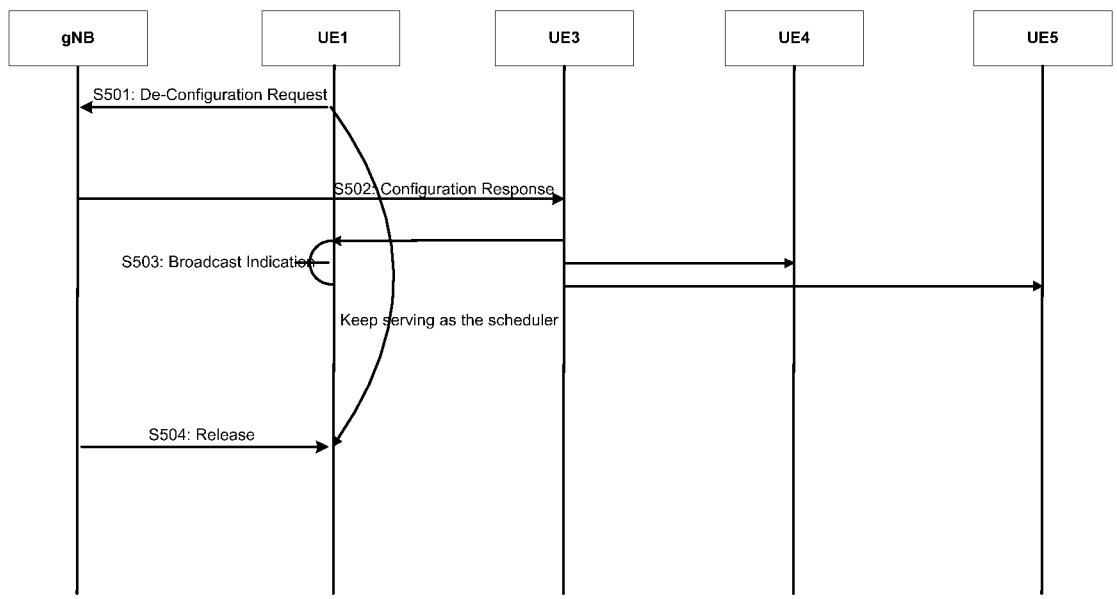
FIG. 4 is a call flow illustrating deprivation of a scheduler by a gNB according to a third embodiment.

FIG. 4 is a call flow illustrating deprivation of a scheduler by a gNB according to a third embodiment.

In step S401, the gNB learns the signal strength (such as RSRP value, RSRQ values, or RSSI values) from the current scheduler (i.e. UE1 as shown in FIG. 4) continually (for example, periodically). For example, the signal strength may be included in the measurement report from UE1 to gNB. As shown in step S401, the signal strength from UE4 is below a first threshold consistently.

In step S402, the gNB determines that the signal strength from UE1 is below a first threshold for a first time duration. Thus, the gNB transmits a release command to UE1, which is used to indicate that UE1 is not responsible for assisting in resource allocation for the group of UEs.

It could be understood that the release command may not be received by UE4, for example, in the case that UE4 moves out of the coverage of the gNB. However, from the perspective of the gNB, UE4 is not the scheduler any more, and scheduling request used to apply for resource through UE4 may not be responded by the gNB. It may cause the UE, which has transmitted the schedule request, to seek another way to apply for resource.

Figure 5:
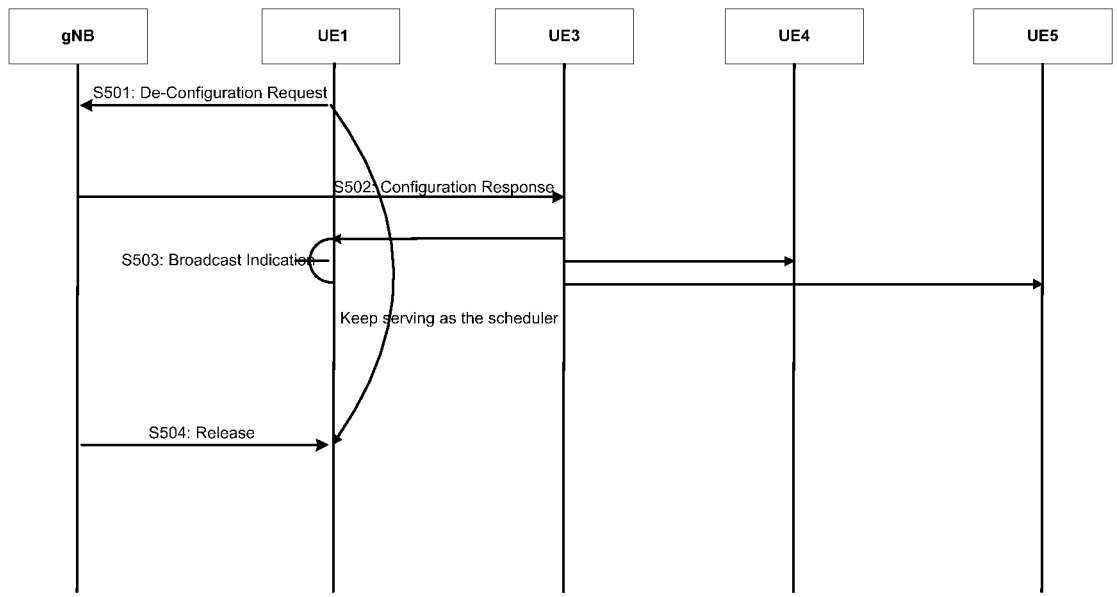
FIG. 5 is a call flow illustrating deprivation of a scheduler by a gNB according to a fourth embodiment.

FIG. 5 is a call flow illustrating deprivation of a scheduler by a gNB according to a fourth embodiment.

In step S501, UE1, which was determined as a scheduler by the gNB before, transmits a de-configuration request indicating that it does not intend to assist in resource allocation for the group members.

Optionally, the gNB selects another UE as a new scheduler assisting in resource allocation for the group of UEs before depriving UE1 of being the scheduler. Preferably, the gNB selects a UE, which has transmitted the configuration request to indicate the intention of assisting in the resource allocation, as the new scheduler. It could be understood that the gNB also determines the new scheduler according to one or more of the group member information, the UE capability included in the configuration request as well as the signal strength from the UE. Once the gNB determines the new scheduler (i.e. UE3 as shown in FIG. 5), the gNB transmits a configuration response to the new scheduler, indicating that UE3 is the scheduler assisting in resource allocation for the group of UEs.

In step S503, the new scheduler (i.e. UE3 as shown in FIG. 5) broadcasts an indication to the group of UEs, indicating that UE3 is the scheduler assisting in resource allocation for the group of UEs. The details of this step is similar with that of step 203 in FIG. 2, therefore the corresponding description is omitted for the purpose of brevity and concision.

In step S504, the gNB transmits the release command to UE, which indicates that UE1 is not responsible for assisting in resource allocation for the group of UEs. Optionally, as shown in FIG. 5, UE1 keeps serving as the scheduler until the release command is received, in order to improve reliability of the disclosed mode of resource allocation.

It should be noted that the gNB may deprive the UEs of being assisting in the resource allocation on its own implementation besides the conditions depicted in FIGS. 4-5. In one example, the gNB decides to switch the group members to another mode of resource allocation in which the resource allocation is not assisted by the scheduler. In another example, the gNB detects that the number of schedulers meets a maximum value, thereby a scheduler with lower signal strength or with fewer group member information is deprived of being the scheduler.

Preferably, the gNB selects a new scheduler before transmission of the release command to ensure there are enough schedulers assisting in the resource allocation. However, in the case that the gNB cannot select the first UE as the new scheduler before the last scheduler is going to be deprived of assisting in the resource allocation, optionally, the gNB may still transmit the release command to the last scheduler. In that case, the member UE will be forced to switch to another mode of resource allocation such as mode 1 or mode 2, in which the resource allocation is not assisted by the scheduler.

Figure 6:
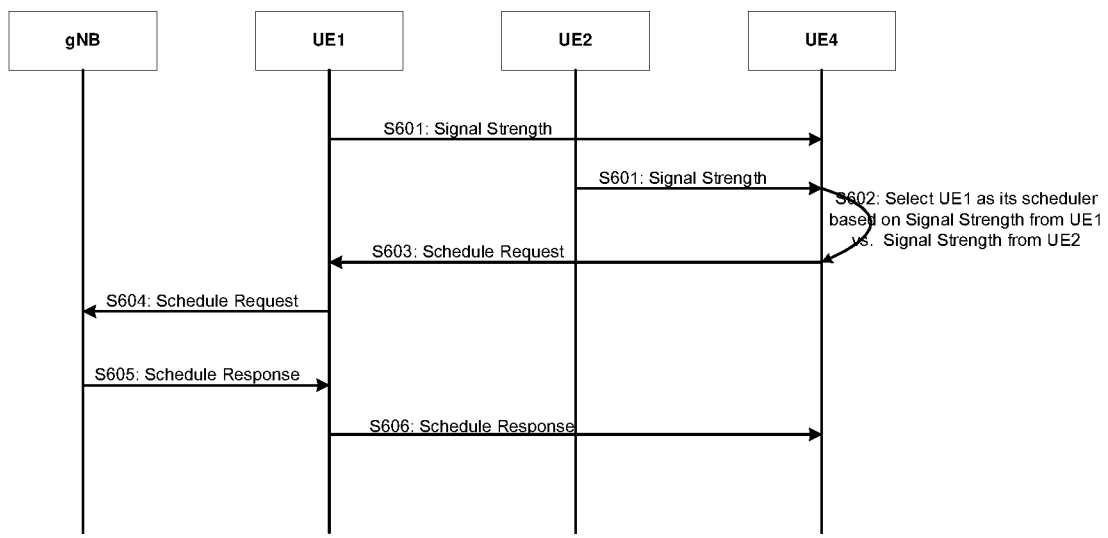
FIG. 6 is a call flow illustrating resource allocation for a member UE in the assistance of a scheduler according to a fifth embodiment.
Figure 7:
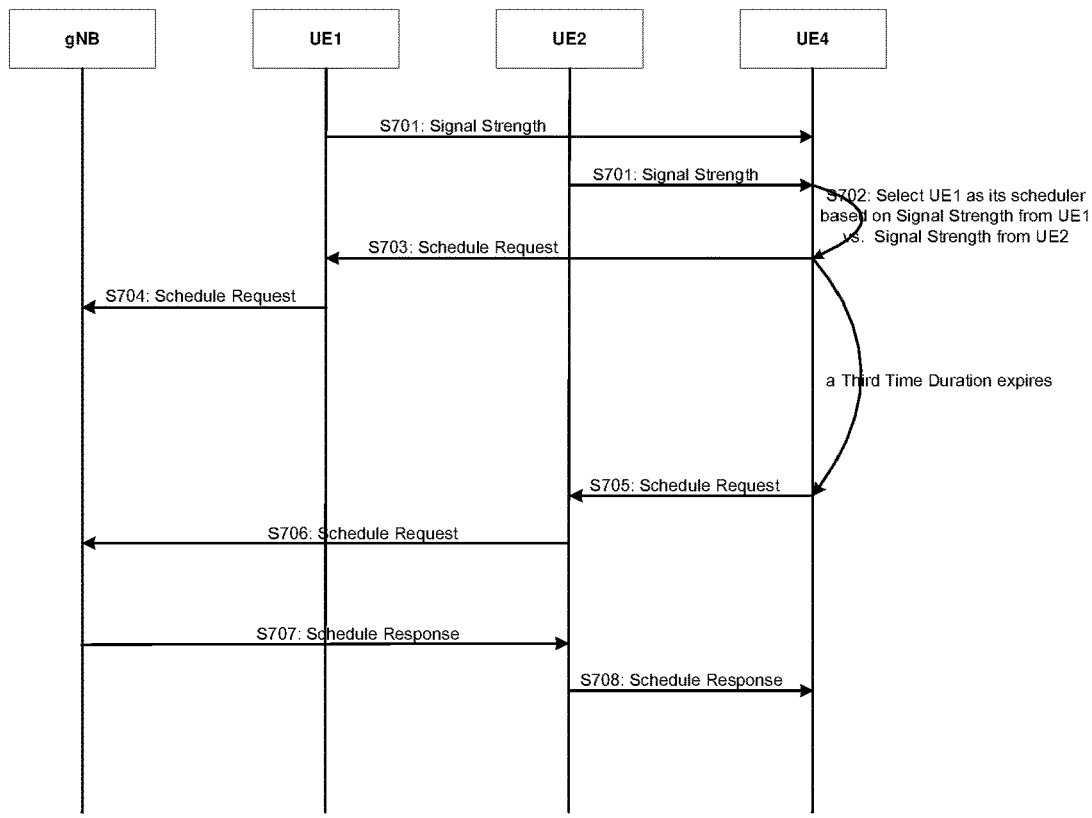
FIG. 7 is a call flow illustrating resource allocation for a member UE in the assistance of a scheduler according to a sixth embodiment.
Figure 8:
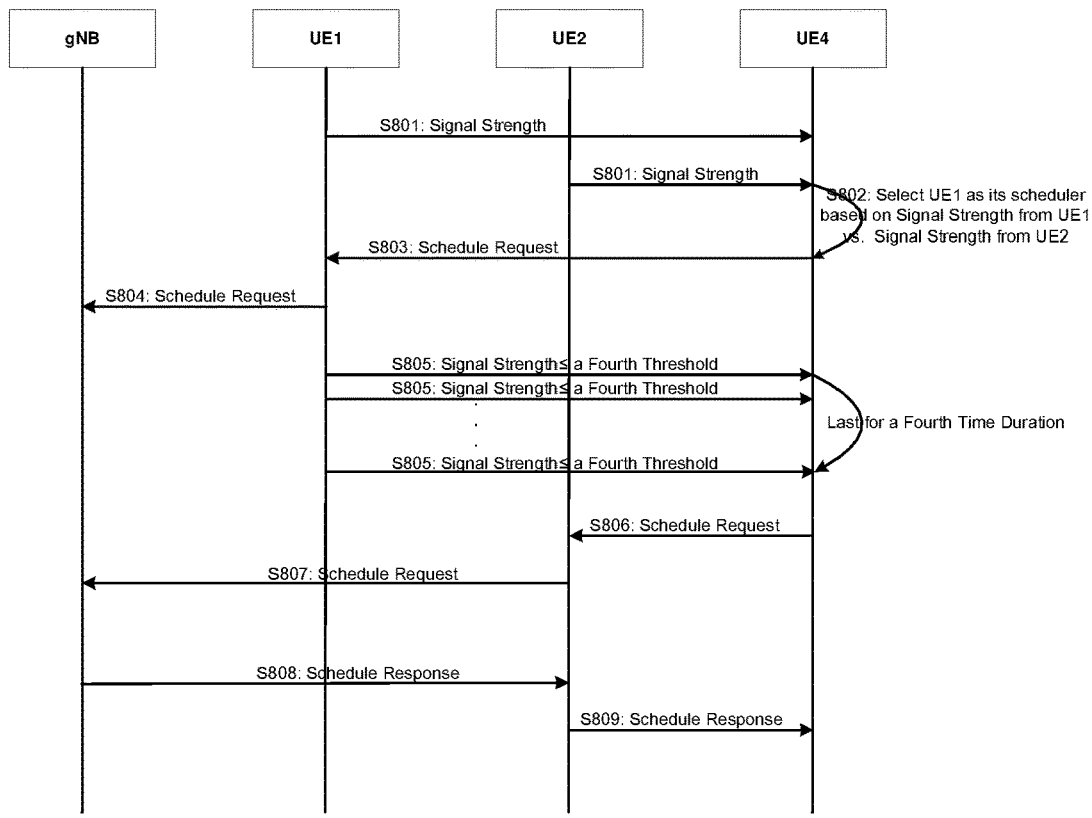
FIG. 8 is a call flow illustrating resource allocation for a member UE in the assistance of a scheduler according to a seventh embodiment.

FIGS. 6-8 refers to details of resource allocation for a member UE in the assistant of the scheduler.

FIG. 6 is a call flow illustrating resource allocation for a member UE in the assistance of a scheduler according to a fifth embodiment.

the UE4, which is a member UE, decides to apply for resource in the assistance of the scheduler. As shown in FIG. 6, there are more than one schedulers (i.e. UE1 and UE2) which can assist in the resource allocation for UE4. In that case, optionally, UE4 select an actual scheduler for the current resource allocation from UE1 and UE2.

In step S601, UE 4 learns the signal strength (such as RSRP value, RSRQ values, or RSSI values) from UE1 and UE2 respectively. As mentioned above, the signal strength may be included in the measurement.

In step S602, UE4 select UE1 as its actual scheduler because the signal strength from UE1 is larger than the signal Strength from UE2. It should be noted that steps S601-S602 are optional. In another embodiment, UE4 may select its actual scheduler from available schedulers randomly or in a round-robin way.

In step S603, UE4 transmits a scheduling request to its current scheduler (i.e. UE1), indicating that resource allocation is required by UE4. Wherein, the scheduling request includes one or more of the group ID, UE4 ID, required resource amount and traffic pattern information. The traffic pattern information refers to a legacy concept defined in 3GPP specification. For example, the traffic pattern information indicates whether Semi-Persistent Scheduling (SPS) is required.

In step S604, UE1 transmits the scheduling request to the gNB. Preferably, UE1 as the scheduler will not change the information in the scheduling request. That is to say, UE1 works in a relay mode in the aspect of forwarding messages. But it's not limited to do so, alternatively, UE1 may insert or update some information in the scheduling request.

In step S605, gNB transmits a scheduling response in response to receiving the scheduling request. The scheduling response indicates a resource pool or dedicated resource available for UE4.

In step S606, UE1 transmits the scheduling response to UE4. Preferably, UE1 as the scheduler will not change the information in the scheduling response. That is to say, UE1 works in a relay mode in the aspect of forwarding messages. But it's not limited to do so, alternatively, UE1 may insert or update some information in the scheduling response.

In one embodiment, in the case that the schedulable resource by the gNB does not meet the required resource amount by UE4, the scheduling response transmitted by the scheduler and then by UE1 indicates that UE4 needs to be switched to another mode of resource allocation such as mode 1 or mode 2, in which the resource allocation for UE4 is not assisted by the scheduler. For example, UE4 needs to determine the resource for sidelink transmission from a pre-indicated resource pool by the gNB or a pre-configured resource pool. That is, UE 4 can be switched to mode 2 for resource allocation.

In another embodiment, in the case that the schedulable resource by the gNB does not meet the required resource amount by UE4, the scheduling response transmitted by the scheduler and then by UE1 indicates that the scheduling of resource is postponed. In that case, for example, UE4 will wait for quite a time to apply for the resource again.

FIG. 7 is a call flow illustrating resource allocation for a member UE in the assistance of a scheduler according to a sixth embodiment. The steps S701-S704 are similar with steps S601-S604 in FIG. 6, therefore the descriptions thereof are omitted for the purpose of brevity and concision.

It is noted that UE1 is selected as the actual scheduler assisting in the resource allocation for UE4 in a first place. However, as shown in FIG. 7, a third time duration expires since the transmission of scheduling request by UE4, however the corresponding scheduling response has not been received. Therefore UE4 decides to select another scheduler to assist in the resource allocation. It could be understood that the selection of another scheduler can be also based on the signal strength from available schedulers, but it's not a limitation.

In step S705, UE4 selects UE2 as a new scheduler assisting in the resource allocation. UE4 transmits the scheduling request to UE2, which also includes one or more of the group ID, UE4 ID, required resource amount and traffic pattern information. In step S706, UE2 forwards the scheduling request to the gNB. In step S707, the gNB transmits the scheduling response, which also indicates a resource pool or dedicated resource available for UE4, in response to receiving the scheduling request. In step S707, UE2 forwards the scheduling response to UE4.

FIG. 8 is a call flow illustrating resource allocation for a member UE in the assistance of a scheduler according to a seventh embodiment. The steps S801-S804 are similar with steps S601-S604 in FIG. 6, therefore the descriptions thereof are omitted for the purpose of brevity and concision.

It is noted that UE1 is selected as the actual scheduler assisting in the resource allocation for UE4 in a first place. However, as shown in step S805 of FIG. 8, the signal strength from UE1 is below a fourth threshold for a fourth time duration, which implies that UE1 may not be suitable for assisting in the resource allocation for UE4. In that case, UE4 decides to select another scheduler to assist in the resource allocation. It could be understood that the selection of another scheduler can be also based on the signal strength from available schedulers, but it's not a limitation.

In step S806, UE4 selects UE2 as a new scheduler assisting in the resource allocation. UE4 transmits the scheduling request to UE2, which also includes one or more of the group ID, UE4 ID, required resource amount and traffic pattern information. In step S807, UE2 forwards the scheduling request to the gNB. In step S808, the gNB transmits the scheduling response, which also indicates a resource pool or dedicated resource available for UE4, in response to receiving the scheduling request. In step S809, UE2 forwards the scheduling response to UE4.

As shown in FIG. 7 or 8, the member UE determines one scheduler each time to transmit the scheduling request, optionally based on signal strength from the scheduler, in the case that more than one schedulers are available.

It should be understood that in the case that no schedulers (i.e. UE1 and UE2 as shown in FIG. 7 or 8) are available to assist in the resource allocation for the member UE (i.e. UE4 as shown in FIG. 7 or 8), the member UE will switch to another mode of resource allocation such as mode 1 or mode 2, in which the resource allocation for itself is not assisted by the scheduler.

One skilled in the relevant art will recognize, however, that the process described in FIGS. 2-8 is unnecessary to be practiced in the sequence shown in the Figures, and are able to be practiced without one or more of the specific steps, or with other steps not shown in the Figures.

Figure 9:
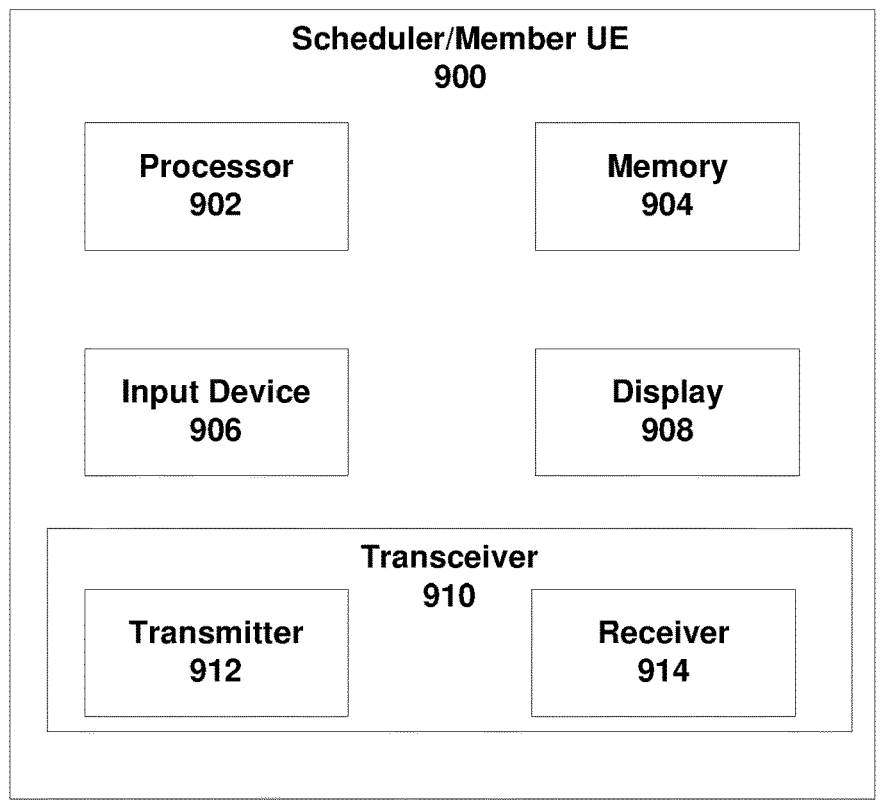
FIG. 9 is a schematic block diagram illustrating components of a UE such as a scheduler or a member UE according to one embodiment.

FIG. 9 is a schematic block diagram illustrating components of a UE such as a scheduler or a member UE according to one embodiment; and UE900 is an embodiment of the scheduler (the first UE) and the member UE (the second UE) described from FIG. 1 to FIG. 8. Furthermore, UE 900 may include a processor 902, a memory 904, and a transceiver 910. In some embodiments, UE 900 may include an input device 906 and/or a display 908. In certain embodiments, the input device 906 and the display 908 may be combined into a single device, such as a touch screen.

The processor 902, in one embodiment, may include any known controller capable of executing computer-readable instructions and/or capable of performing logical operations. For example, the processor 902 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 902 executes instructions stored in the memory 904 to perform the methods and routines described herein. The processor 902 is communicatively coupled to the memory 904, the input device 906, the display 908, and the transceiver 910.

In some embodiments, the processor 902 controls the transceiver 910 to transmit a RRC signaling to Network Equipment 1000 and/or receive RRC signaling from Network Equipment 1000. In certain embodiments, the processor 902 may monitor DL signals received via the transceiver 910 for specific messages.

The memory 904, in one embodiment, is a computer readable storage medium. In some embodiments, the memory 904 includes volatile computer storage media. For example, the memory 904 may include a RAM, including dynamic RAM ("DRAM"), synchronous dynamic RAM ("SDRAM"), and/or static RAM ("SRAM"). In some embodiments, the memory 904 includes non-volatile computer storage media. For example, the memory 904 may include a hard disk drive, a flash memory, or any other suitable non-volatile computer storage device. In some embodiments, the memory 904 includes both volatile and non-volatile computer storage media. In some embodiments, the memory 904 stores data relating to information of the group of UE including group ID and group membership. In some embodiments, the memory 904 also stores program code and related data, such as an operating system or other controller algorithms operating on UE 900.

UE 900 may optionally include an input device 906. The input device 906, in one embodiment, may include any known computer input device including a touch panel, a button, a keyboard, a stylus, a microphone, or the like. In some embodiments, the input device 906 may be integrated with the display 908, for example, as a touch screen or similar touch-sensitive display. In some embodiments, the input device 906 includes a touch screen such that text may be input using a virtual keyboard displayed on the touch screen and/or by handwriting on the touch screen. In some embodiments, the input device 906 includes two or more different devices, such as a keyboard and a touch panel. In certain embodiments, the input device 906 may include one or more sensors for monitoring an environment of UE 900.

UE 900 may optionally include a display 908. The display 908, in one embodiment, may include any known electronically controllable display or display device. The display 908 may be designed to output visual, audible, and/or haptic signals. In some embodiments, the display 908 includes an electronic display capable of outputting visual data to a user. For example, the display 908 may include, but is not limited to, an LCD display, an LED display, an OLED display, a projector, or a similar display device capable of outputting images, text, or the like to a user. As another, non-limiting, example, the display 908 may include a wearable display such as a smart watch, smart glasses, a heads-up display, or the like. Further, the display 908 may be a component of a smart phone, a personal digital assistant, a television, a table computer, a notebook (laptop) computer, a personal computer, a vehicle dashboard, or the like.

In certain embodiments, the display 908 may include one or more speakers for producing sound. For example, the display 908 may produce an audible alert or notification (e.g., a beep or chime). In some embodiments, the display 908 includes one or more haptic devices for producing vibrations, motion, or other haptic feedback. In some embodiments, all or portions of the display 908 may be integrated with the input device 906. For example, the input device 906 and display 908 may form a touch screen or similar touch-sensitive display. In other embodiments, the display 908 may be located near the input device 906.

The transceiver 910, in one embodiment, is configured to communicate wirelessly with Network Equipment 1000. In certain embodiments, the transceiver 910 comprises a transmitter 912 and a receiver 914. The transmitter 912 is used to transmit UL communication signals to Network Equipment 1200 and the receiver 914 is used to receive DL communication signals from Network Equipment 1200. For example, the transmitter 912 may transmit a measurement report including the signal strength. As another example, the receiver 914 may receive RRC signaling from Network Equipment 1000.

The transmitter 912 and the receiver 914 may be any suitable types of transmitters and receivers. Although only one transmitter 912 and one receiver 914 are illustrated, the transceiver 910 may have any suitable number of transmitters 912 and receivers 914. For example, in some embodiments, UE 900 includes a plurality of transmitter 912 and receiver 914 pairs for communicating on a plurality of wireless networks and/or radio frequency bands, each transmitter 912 and receiver 914 pair configured to communicate on a different wireless network and/or radio frequency band than the other transmitter 912 and receiver 914 pairs.

Figure 10:
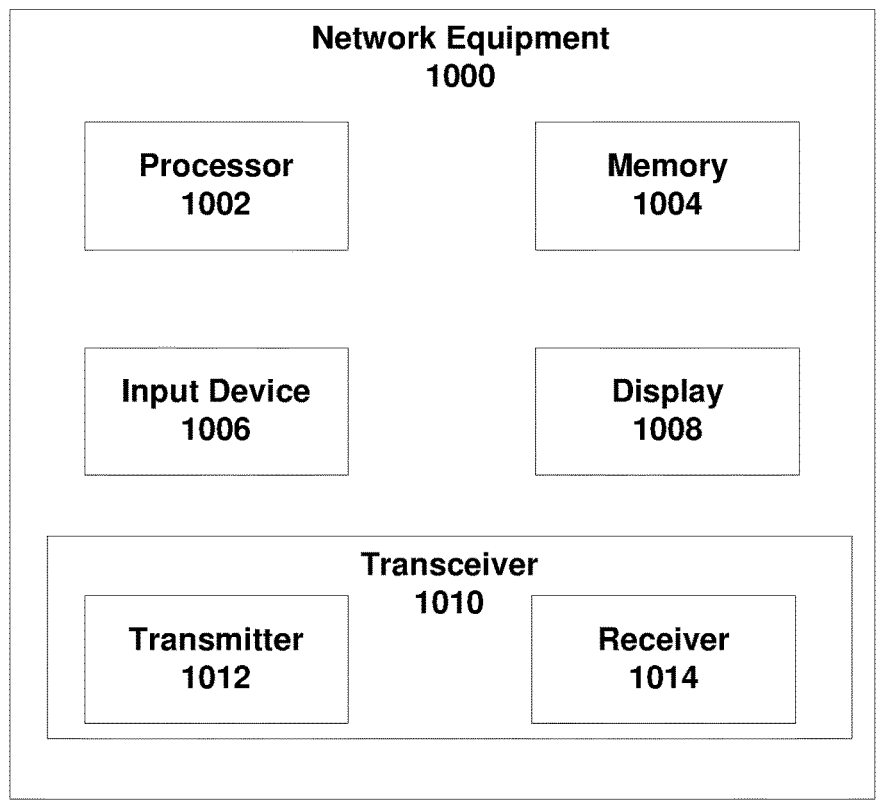
FIG. 10 is a schematic block diagram illustrating components of a network equipment according to one embodiment.

FIG. 10 is a schematic block diagram illustrating components of a network equipment according to one embodiment.

Network Equipment 1000 includes one embodiment of eNB described from FIG. 1 to FIG. 8. Furthermore, Network Equipment 1000 may include a processor 1002, a memory 1004, an input device 1006, a display 1008, and a transceiver 1010. As may be appreciated, the processor 1002, the memory 1004, the input device 1006, and the display 1008 may be substantially similar to the processor 1002, the memory 1004, the input device 1006, and the display 1008 of UE 900, respectively.

In some embodiments, the processor 1002 controls the transceiver 1010 to transmit DL signals to UE 1000. The processor 1002 may also control the transceiver 1010 to receive UL signals from UE 900. For example, the processor 1002 may control the transceiver 1010 to receive RRC signaling from UE 900. In another example, the processor 1002 may control the transceiver 1010 to transmit RRC signaling to UE 900, as described above.

The transceiver 1010, in one embodiment, is configured to communicate wirelessly with UE 900. In certain embodiments, the transceiver 1010 comprises a transmitter 1012 and a receiver 1014. The transmitter 1012 is used to transmit DL communication signals to UE 900 and the receiver 1014 is used to receive UL communication signals from UE 900.

The transceiver 1010 may communicate simultaneously with a plurality of UE 900. For example, the transmitter 1012 may transmit DL communication signals to UE 900. As another example, the receiver 1014 may simultaneously receive UL communication signals from UE 900. The transmitter 1012 and the receiver 1014 may be any suitable types of transmitters and receivers. Although only one transmitter 1012 and one receiver 1014 are illustrated, the transceiver 1010 may have any suitable number of transmitters 1012 and receivers 1014. For example, Network Equipment 1000 may serve multiple cells and/or cell sectors, wherein the transceiver 1010 includes a transmitter 1012 and a receiver 1014 for each cell or cell sector.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus for performing a network function, the apparatus comprising:
   at least one memory; and
   at least one processor coupled with the at least one memory and configured to cause the apparatus to:
   receive a configuration request from a first user equipment, which is used to indicate that the first user equipment intends to assist in resource allocation for a group of user equipments, wherein the configuration request comprises at least one of:
   a group identification;
   group member information;
   an identification of the first user equipment; or
   a capability of the first user equipment;
   determine, based at least in part on the configuration request, that the first user equipment is a scheduler assisting in resource allocation for the group of user equipments according to at least one of: the group member information, the capability of the first user equipment, or a signal strength from the first user equipment; and
   transmit a configuration response to the first user equipment, which is used to indicate that the first user equipment is the scheduler assisting in resource allocation for the group of user equipments.

2. The apparatus of claim 1, wherein the at least one processor is further configured to cause the apparatus to:
   determine that a scheduler is not responsible for assisting in resource allocation for the group of user equipments; and
   transmit a release command to the scheduler, which is used to indicate that the scheduler is not responsible for assisting in resource allocation for the group of user equipments.

3. The apparatus of claim 2, wherein the at least one processor is further configured to cause the apparatus to determine that a scheduler is not responsible for assisting in resource allocation for the group of user equipments if the signal strength from the scheduler is below a first threshold for a first time duration, or a de-configuration request is received from the scheduler which is used to indicate that the scheduler does not intend to assist in resource allocation for the group of user equipments.

4. The apparatus of claim 2, wherein the at least one processor is further configured to cause the apparatus to determine another first user equipment as a new scheduler assisting in resource allocation for the group of user equipments before transmitting the release command to the scheduler.

5. The apparatus of claim 1, wherein the at least one processor is further configured to cause the apparatus to:
   receive a scheduling request from the scheduler, which is used to indicate that resource allocation is required by a second user equipment in the group of user equipments, wherein the scheduling request includes at least one of:

the group identification;
an identification of the second user equipment;
a required resource amount; or
traffic pattern information;
determine a resource pool or dedicated resource available for the second user equipment in the group of user equipments; and
transmit a scheduling response to the scheduler, which is used to indicate the resource pool or dedicated resource available for the second user equipment in the group of user equipments.

6. The apparatus of claim 5, wherein the at least one processor is further configured to cause the apparatus to:
determine to switch the second user equipment to another mode of resource allocation in which the resource allocation for the second user equipment is not assisted by the scheduler, if the available resource does not meet the required resource amount by the second user equipment; and
transmit the scheduling response to the scheduler, which is used to indicate that the second user equipment is switched to the another mode of resource allocation.

7. The apparatus of claim 5, wherein the at least one processor is further configured to cause the apparatus to:
postpone scheduling of resource for the second user equipment, if the available resource does not meet the required resource amount by the second user equipment; and
transmit a scheduling response to the scheduler, which is used to indicate that the scheduling of resource for the second user equipment is postponed.

8. A user equipment (UE), comprising:
at least one memory; and
at least one processor coupled with the at least one memory and configured to cause the UE to:
transmit a configuration request to a network equipment, which is used to indicate an intention of assisting in resource allocation for a group of user equipments, wherein the configuration request includes at least one of:
a group identification;
group member information;
an apparatus identification; or
an apparatus capability; and
receive a configuration response from the network equipment if the UE is selected as the scheduler by the network equipment based at least in part on the configuration request and according to at least one of: the group member information, the capability of the user equipment, or a signal strength from the user equipment.

9. The UE of claim 8, wherein:
the at least one processor is further configured to cause the UE to receive a release command from the network equipment, which is used to indicate that the UE is not the scheduler assisting in resource allocation for the group of user equipments.

10. The UE of claim 9, wherein, the release command is received from the network equipment in response to the signal strength to the network equipment being below a first threshold for a first time duration, or a de-configuration request is transmitted from the UE which is used to indicate no intention assisting in resource allocation for the group of user equipments.

11. The UE of claim 10, wherein, if the de-configuration request is transmitted from the UE, the UE keeps serving as the scheduler until the release command is received from the network equipment.

12. The UE of claim 8, wherein the at least one processor is further configured to cause the UE to:
broadcast an indication including the group identification to the group of user equipments, which is used to indicate that the UE is the scheduler assisting in resource allocation for the group of user equipments.

13. The UE of claim 12, wherein the at least one processor is further configured to cause the UE to:
broadcast an indication further including a second threshold and a second time duration to the group of user equipments, which is used to indicate that the UE will be the scheduler assisting in resource allocation for the group of user equipments if the signal strength to the group of user equipments is higher than the second threshold for the second time duration.

14. The UE of claim 8, wherein:
the at least one processor is further configured to cause the UE to:
receive a scheduling request from a second user equipment in the group of user equipments, which is used to indicate that resource allocation is required by the second user equipment, wherein, the scheduling request includes one or more of the group ID, an identification of the second user equipment, required resource amount and traffic pattern information;
transmit the scheduling request to the network equipment;
receives a scheduling response from the network equipment, which is used to indicate a resource pool or dedicated resource available for the second user equipment in the group of user equipments; and
transmit the scheduling response to the second user equipment.

15. An apparatus, comprising:
at least one memory; and
at least one processor coupled with the at least one memory and configured to cause the apparatus to:
receive an indication from a first user equipment, which is used to indicate that the first user equipment intends to be a scheduler assisting in resource allocation for a group of user equipments including the apparatus, wherein the indication comprises at least one of: a group identification, group member information, an identification of the first user equipment, or a capability of the first user equipment; and
determine, based at least in part on the indication, that the first user equipment is the scheduler assisting in resource allocation according to at least one of: the group member information, the capability of the first user equipment, or a signal strength from the first user equipment.

16. The apparatus of claim 15, wherein, the indication further includes a second threshold and a second time duration, and wherein:
the at least one processor is further configured to cause the apparatus to determine that the first user equipment is the scheduler assisting in resource allocation if the signal strength from the first user equipment is higher than the second threshold for the second time duration.

17. The apparatus of claim 15, wherein:
the at least one processor is further configured to cause the apparatus to:

transmit a scheduling request to the scheduler, which is used to indicate that resource allocation is required by the apparatus, wherein the scheduling request includes one or more of the group ID, an identifier of the apparatus, required resource amount and traffic pattern information; and receive a scheduling response from the scheduler, which is used to indicate an available resource pool or dedicated resource.

18. The apparatus of claim 17, wherein:
the at least one processor is further configured to cause the apparatus to determine one scheduler each time to transmit the scheduling request, based on signal strength from the scheduler, in response to more than one schedulers being available.

19. The apparatus of claim 17, wherein:
the at least one processor is further configured to determine another scheduler in in response to a scheduling response not being received for a third time duration since the transmission of the scheduling request, or signal strength from the scheduler is below a fourth threshold for a fourth time duration.

* * * * *